US012782221B2

(12) United States Patent
Delbos

(10) Patent No.: US 12,782,221 B2
(45) Date of Patent: Nov. 3, 2026

(54) SMARTPHONE APPLICATION FOR CALCULATING PRESSURE

(71) Applicant: Ratier-Figeac SAS, Figeac (FR)

(72) Inventor: Eric Delbos, Lacapelle Marival (FR)

(73) Assignee: RATIER-FIGEAC SAS, Figeac (FR)

( * ) Notice: Subject to any disclaimer, the term of this patent is extended or adjusted under 35 U.S.C. 154(b) by 952 days.

(21) Appl. No.: 17/950,403

(22) Filed: Sep. 22, 2022

(65) Prior Publication Data

US 2023/0112364 A1 Apr. 13, 2023

(30) Foreign Application Priority Data

Sep. 24, 2021 (EP) .................................... 21306321

(51) Int. Cl.

*G01J 5/10* (2006.01)
*G01L 19/00* (2006.01)
*G01L 19/04* (2006.01)
*G01L 19/08* (2006.01)
(Continued)

(52) U.S. Cl.

CPC .............. *G01L 19/086* (2013.01); *G01J 5/10* (2013.01); *G01L 19/0092* (2013.01); *G01L 19/04* (2013.01); *G01L 19/083* (2013.01); *G01L 27/002* (2013.01); *G01J 2005/0077* (2013.01); *G05B 2219/32014* (2013.01)

(58) Field of Classification Search

CPC ... G01L 19/086; G01L 19/0092; G01L 19/04; G01L 19/083; G01L 27/002; G01J 5/10; G01J 2005/0077; G05B 2219/32014

See application file for complete search history.

(56) References Cited

U.S. PATENT DOCUMENTS

| | | | | |
|---|---|---|---|---|
| 5,367,797 A * | 11/1994 | Zaim | G01M 3/3263 73/40 |
| 6,981,422 B1 * | 1/2006 | Comardo | G01M 3/3227 73/756 |
| 10,953,709 B2 | 3/2021 | Bickard et al. | |

(Continued)

FOREIGN PATENT DOCUMENTS

WO WO-2019231861 A1 * 12/2019 ........... G06V 40/107

OTHER PUBLICATIONS

Control Engineering, "Uncompensated, unamplified, board -mount pressure sensors," Jul. 12, 2011. (Year: 2011).*

(Continued)

*Primary Examiner* — Marc E Norman

(74) *Attorney, Agent, or Firm* — CANTOR COLBURN LLP

(57) ABSTRACT

A method of calculating and outputting pressure information about the status of an actual pressure of a gas bottle of a door damper at 200° C., performed on a smart device. The method includes receiving, from a non-compensated pressure gauge, a pressure input indicating an actual pressure of said gas bottle of said door damper at ambient temperature, receiving a temperature input indicating an actual temperature of said gas bottle of said door damper, and using said inputs to calculate and convert said actual pressure of said gas bottle of said door damper at ambient temperature to a pressure at a temperature of 200° C., and further comprising outputting pressure information about the status of the gas bottle of said door damper based on said converted pressure at 200° C.

12 Claims, 1 Drawing Sheet

(51) Int. Cl.

| | |
|---|---|
| ***G01L 27/00*** | (2006.01) |
| *G01J 5/00* | (2022.01) |

(56) References Cited

U.S. PATENT DOCUMENTS

| | | | | |
|---|---|---|---|---|
| 2004/0211353 | A1* | 10/2004 | Lawrence | G01L 19/12<br>116/272 |
| 2013/0070099 | A1 | 3/2013 | Gellaboina et al. | |
| 2017/0003189 | A1 | 1/2017 | Bernard et al. | |
| 2018/0253619 | A1 | 9/2018 | Petruk | |
| 2019/0204175 | A1 | 7/2019 | Cegnar et al. | |
| 2019/0331195 | A1* | 10/2019 | Lee | F16F 15/023 |
| 2020/0264031 | A1 | 8/2020 | Lease et al. | |
| 2021/0199247 | A1 | 7/2021 | Goudalle et al. | |
| 2024/0133225 | A1* | 4/2024 | Mortland | E05D 15/28 |

OTHER PUBLICATIONS

European Search Report for Application No. 21306321.7, mailed Mar. 10, 2022, 7 pages.

* cited by examiner

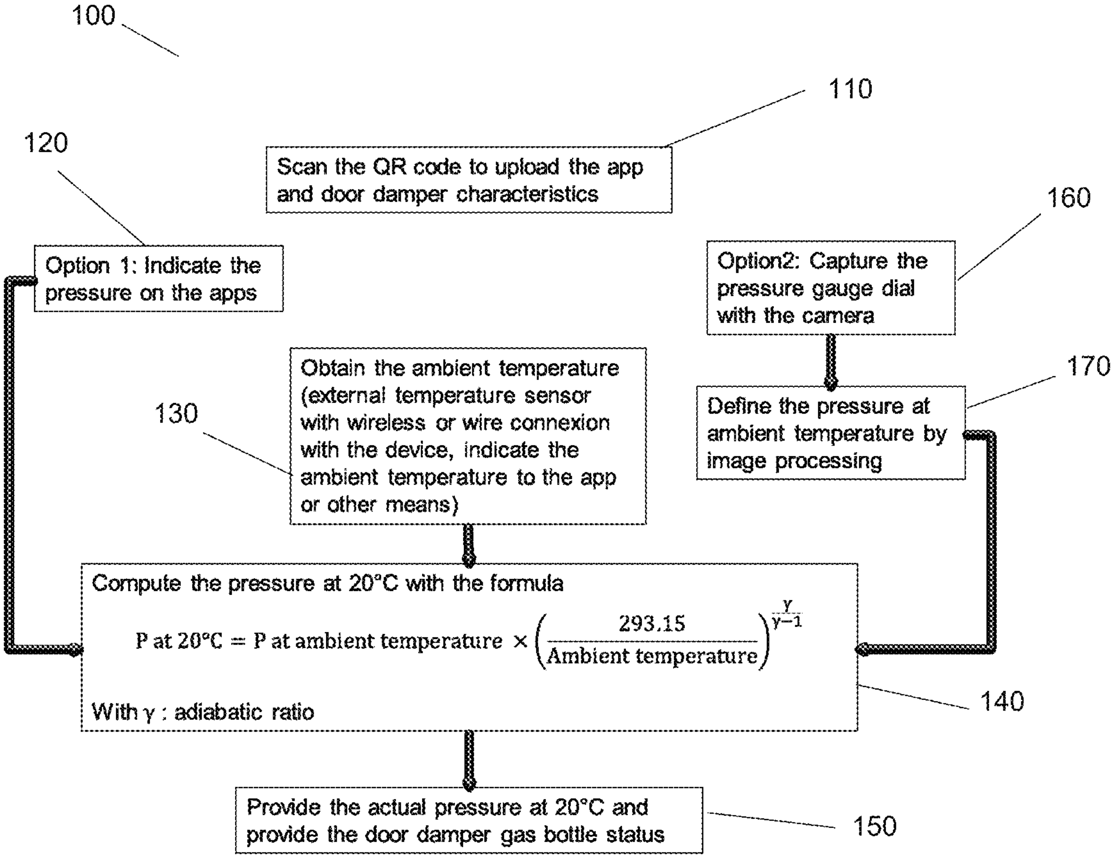
Figure 1
Figure 2
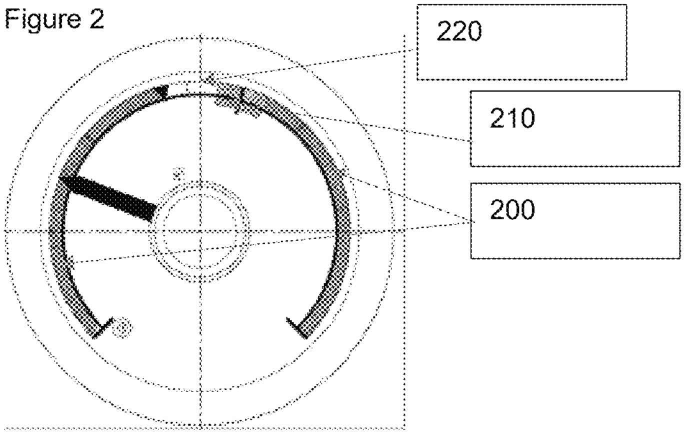

SMARTPHONE APPLICATION FOR CALCULATING PRESSURE

CROSS-REFERENCE TO RELATED APPLICATIONS

This application claims priority to European Patent Application No. 21306321.7 filed Sep. 24, 2021, the entire contents of which is incorporated herein by reference.

FIELD

The examples described herein relate to the calculation of actual gas pressure at 20° C.

BACKGROUND

Aircraft doors comprise a door damper, which has two main functions. The first function is to damp the door during its normal opening, to thereby avoid crew injuries and/or aircraft structure damage. This function of the door damper is performed by a hydraulic damper. The second function, is to allow the door to open quickly and deploy the evacuation slide in the event of an emergency evacuation. This function of the door damper is performed by a pneumatic actuator with a high pressure gas bottle for storing the energy.

When not in flight, maintenance personnel and/or a crew member checks the pressure of the gas bottle associated with the door damper to ensure that it contains the right level of energy to perform its function. This check is achieved by using a pressure gauge that is installed on the gas bottle. The pressure gauge uses the Bourdon tube principle to indicate the pressure on a dial. This pressure gauge may be a compensated pressure gauge in order to read the pressure at 20° C., irrespective of the ambient door temperature. Alternatively, it may be a standard pressure gauge, in which case the temperature must also be measured and a conversion table is required to allow the maintenance personnel and/or a crew member to calculate the actual pressure at 20° C.

SUMMARY

A method of calculating and outputting pressure information about the status of an actual pressure of a gas bottle of a door damper at 20° C., performed on a smart device, is described herein, said method comprising, on the smart device: receiving, from a non-compensated pressure gauge, a pressure input indicating an actual pressure of said gas bottle of said door damper at ambient temperature, receiving a temperature input indicating an actual temperature of said gas bottle of said door damper, and using said inputs to calculate and convert said actual pressure of said gas bottle of said door damper at ambient temperature to a pressure at a temperature of 20° C., and further comprising outputting pressure information about the status of the gas bottle of said door damper based on said converted pressure at 20° C.

In some examples, the step of receiving a pressure input indicating an actual pressure of the gas bottle of said door damper at ambient temperature comprises manually inputting said pressure into said smart device.

In other examples, the step of receiving a pressure input indicating an actual pressure of the gas bottle comprises, wherein said smart device comprises a camera, capturing an image of said pressure gauge with said camera, and using image processing to determine, based on said captured image, said actual pressure of said gas bottle of said door damper at ambient temperature.

In some examples, the step of receiving said temperature input comprises obtaining said ambient temperature using a temperature sensor device that is provided externally of said smart device.

In some examples, said external temperature sensing device may have a wired or wireless connection to the smart device and the smart device may be configured to receive the ambient temperature from the temperature sensing device either via the wired connection or via a wireless connection.

In some examples the smart device may comprise, or be connected or associated with, a thermal camera and the step of receiving said temperature input may comprise obtaining said ambient temperature input from said thermal camera.

In some examples, the step of providing said outputted pressure information may comprise outputting, via said smart device, the converted pressure at a temperature of 20° C. This may be outputting in text form on a screen of a device. In other examples, this may be outputted using sound.

In some examples, the step of providing said outputted pressure information comprises providing a visual depiction, on said smart device, of whether or not the converted pressure of the gas bottle at 20° C. of said door damper lies within a predefined pressure range.

A plurality of predefined ranges may be provided. The predefined ranges may indicate that the converted pressure lies within an acceptable pressure range wherein the gas bottle pressure does not need adjusting, or alternatively within an unacceptable pressure range wherein the gas bottle pressure needs adjusting. Another range may indicate that the pressure needs only minor adjustment.

In some examples, the step of providing said outputted pressure information may comprise using two or more, or a plurality of, colours to indicate whether or not the converted pressure at 20° C. of said gas bottle lies within a predefined range or ranges.

The step of providing said outputted pressure information may comprise using augmented reality to provide a superimposed image of two or more ranges on an image of the pressure gauge, such that one of said predefined ranges is positioned over the dial of said pressure gauge, based on said converted pressure at 20° C.

This may comprise showing one predefined pressure range in a first colour, and a second predefined range in a second colour, each colour providing an indication of whether or not that range is acceptable or unacceptable.

The smart device may comprise a camera and the method may comprise taking an image of the pressure gauge using the camera of the smart device, or using the camera to produce a live image on the screen of the smart device, and may further comprise using augmented reality to superimpose a visual depiction of a range or ranges on the image of the pressure gauge. Each visually depicted range may indicate the acceptability of the pressure within that range. For example, a range that is depicted as green may indicate an acceptable pressure range, whereas a zone that is red may indicate an unacceptable pressure range.

Based on whether or not the converted pressure at 20° C. is acceptable, the visual depiction of the range or ranges will be superimposed onto the image of the actual pressure gauge, such that the dial of the pressure gauge lies within the correct range, e.g. if the pressure is too low, the superimposed image will be depicted such that the dial of the pressure gauge indicates this.

In some examples, the method may further comprise providing a QR code on said pressure gauge or on said door damper, and scanning said QR code and using said QR code to identify the pressure gauge and/or said door damper and its characteristics.

In some examples the pressure input and/or said temperature input may be detected by and received from a camera of said smart device.

A non-transitory computer readable storage medium and a processor is also described herein, configured to, by a control app installed on a smart device: to perform the method of receiving, from a non-compensated pressure gauge, a pressure input indicating an actual pressure of a gas bottle associated with a door damper at ambient temperature, and receiving a temperature input indicating an actual temperature of a gas bottle associated with said door damper, and convert said actual pressure of said gas bottled door damper at ambient temperature to a pressure at a temperature of 20° C. and output pressure information about the status of the gas bottle of said door damper based on said converted pressure at 20° C.

The non-transitory computer readable storage medium and processor may be configured to perform any or all of the method steps and have any or all of the features of the method, as described above.

A system comprising a smart device is also described herein, wherein the smart device contains computer-executable instructions to perform the method of: receiving, from a non-compensated pressure gauge, an input indicating an actual pressure of a gas bottle of a damper door at ambient temperature, and receiving an input indicating an actual temperature of the gas bottle of said door damper, and calculate and convert said actual pressure of said gas bottle of said damper door at ambient temperature to a pressure at a temperature of 20° C. and outputting pressure information about the status of the gas bottle of the door damper based on said converted pressure at 20° C.

The non-transitory computer readable storage medium and processor may be configured to perform any or all of the method steps and have any or all of the features of the method, as described above.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 shows the methods that may be performed by the examples described herein; and FIG. 2 shows an example of how the pressure can be depicted and presented to the user, providing a visual indication of whether or not the pressure is within or outside of the correct range.

DETAILED DESCRIPTION

The examples described herein relate to a smartphone application (commonly, and hereinafter, referred to as an app) that may be used to calculate the actual gas pressure of the gas bottle of a door damper for an aircraft at 20° C.

This is achieved by using 1) a pressure input from a non-compensated pressure gauge, the pressure input indicating an actual pressure of the gas bottle of the door damper at ambient temperature in combination with 2) a temperature input, indicating an actual temperature of the gas bottle of said door damper. These two inputs are used to calculate and convert the actual pressure of the gas bottle of the door damper at ambient temperature to a pressure at a temperature of 20° C.

In addition to this, the app then goes on to use this converted pressure at 20° C. to output, via the smart device, pressure information about the status of the gas bottle of the damper door. In some examples, the outputted pressure information may indicate to the user whether or not the pressure of the gas bottle is acceptable or unacceptable for its purpose and whether or not the pressure may need adjusting.

The outputted pressure information may additionally, or alternatively, comprise the output of the value of the converted pressure at a temperature of 20° C. This information may be in the form of text, and/or other visual depictions. In other examples, this may be outputted using sound, for example, with a voice reading out the value of the converted pressure at a temperature of 20° C. Other means and methods of outputting this information may also be used.

Although the examples described herein refer to the gas pressure at 20° C., since this is the temperature necessary to indicate whether a gas bottle is suitable for its purpose in an aircraft door damper, in theory the app may be used to calculate the pressure at other temperatures, if necessary.

As mentioned above in the background section, currently the calculation of the actual pressure at 20° C. of a gas bottle associated with a door damper is done using either a) a standard pressure gauge, in combination with a conversion table, that allows the user to calculate the actual pressure at 20° C., or b) using a compensated pressure gauge which provides the pressure at 20° C., irrespective of the ambient door temperature.

Such compensated pressure gauges are, however, complex, costly and increase the weight and envelope of the door damper. The examples described herein are configured to be able to directly obtain the actual pressure at 20° C. even using a standard pressure gauge, thereby negating the need for a complex compensated pressure gauge.

The present disclosure relates to a method that can be performed on, and by, a smart device, such as a smart phone, a tablet, or computer, for example. Other smart devices not listed here may also be envisaged. The present disclosure also relates to a system that performs that method. The method may be installable on the smart device in the form of an app, or other computer-based program. The present disclosure also relates to a non-transitory computer readable storage medium and a processor that is configured to perform this method.

As mentioned above, access to the method may be provided in the form of an app, on a smart device.

The app and method performed by the app may be used by maintenance personnel and/or an aircraft crew member, such as the personnel that would normally check the doors of the aircraft in between flights and/or maintenance checks. The gas pressure of the gas bottle of the door damper is linked to the gas bottle temperature by the ideal gas law, i.e.

$$PV = nRT \tag{1}$$

where: P is the absolute pressure of a gas, V is the volume it occupies, n is the number of moles in the gas, R is the universal gas constant and T is its absolute temperature.

Non ideal gas formulas (more complex) may be used to convert the gas pressure at 20° C. (high pressure, high/low temperature).

The improved methods and systems described herein automatically calculate and convert the actual pressure of the door at ambient temperature to the pressure at 20° C. and further provide information to the operator of the application about the status of the door damper. This may even be performed using a non-compensated pressure gauge, which utilizes a temperature sensor and conversion law. This calculation can be performed by an algorithm stored within the app.

In addition to the above, in some examples, a QR code may further be provided on the pressure gauge and/or on the door damper in order for the app to recognize which type of pressure gauge and/or door damper is being used, and thereby upload the correct information.

A QR code may therefore be used to identify the pressure gauge and/or to identify the door damper and its pressure characteristics. Such characteristics are needed in order to define the correct range of pressure, for example.

The pressure may be recorded in a cloud-based server to perform further analysis with the information related to the door damper included in the QR code (e.g. Part Number, Serial Number, Date of manufacturing) and information available on smartphone (or other device) as the date, the location etc.

An additional function of the app or method may be to indicate to maintenance personnel the actual pressure to which they have to inflate the reservoir versus the ambient temperature. Indeed, during maintenance operation, the gas reservoir shall be refilled to compensate for leakage and pending the ambient temperature on a non-compensated pressure gauge, this pressure shall be adjusted with the ambient temperature.

The examples provided herein provide a cost saving and weight saving solution which allows maintenance personnel and/or crew member to more easily and more accurately determine the pressure of a door damper mechanism.

An example of the method 100 that may be performed on or by the smart device is now described with reference to FIG. 1.

In examples wherein a QR code is provided on the pressure gauge or on the door damper, the method may comprise scanning the QR code(s) using the camera of the smart device 110. By scanning the QR code, information relating that particular pressure gauge and/or door damper may be uploaded to the smart device. Such information may include characteristics of that door damper, such as Part Number, Serial Number, Date of manufacturing, correct ranges of pressure, etc. as described above. This information may then be uploaded to the app stored on the smart device. In some examples, additional information taken from the smart device itself such as date, GPS location may also be uploaded to the app.

In a first option, 120, the method may comprise the step of the user manually inputting into the app the pressure indicated on the pressure gauge dial.

The method may further comprise the step 130 of obtaining the ambient temperature. This may be achieved by measuring the external temperature using an external temperature sensor device. In some examples the smart device may comprise, or be connected or associated with, a thermal camera. Such temperature acquisition may therefore be performed using the thermal camera of the smart device.

The external temperature sensing device may have a wired or wireless connection to the smart device and the smart device may be configured to receive the ambient temperature from the temperature sensing device either via the wired connection or via a wireless connection. Such wireless connections may comprise NFC, Wi-Fi or Bluetooth, for example, among others. Alternatively, the temperature may be inputted manually via the user.

In some examples, at the step of 130, a thermal camera may be used and the user may use the thermal camera of the smart device, to directly read and input the ambient temperature of the gas bottle.

The camera of the smart device may be used in combination with image processing techniques in order to read and/or display the aircraft ambient temperature.

Once the ambient temperature has been found, the method may then further use this ambient temperature to perform the step 140, of computing the actual pressure at 20° C. using the formula as shown in FIG. 1.

$$P \text{ at } 20^\circ \text{ C.} = P \text{ at ambient temperature} \times \left(\frac{293.15}{\text{Ambient temperature}}\right)^{\frac{\gamma}{\gamma-1}} \quad (2)$$

where γ: adiabatic ratio, Temperature in Kelvin, Pressure in Pascal

The method then comprises 150 outputting status information of the gas bottle to the user. This status information may comprise indicating the actual pressure value at 20° C. to the user, via the display of the smart device. The method may also comprise providing the door damper gas bottle status to the user in the same way.

In some examples, the outputted information relating to the status of the damper door may comprise a visual depiction created on a screen of the smart device, of whether or not the calculated pressure of the door damper at 20° C. falls within an acceptable range. This visual depiction may comprise the use of colours, or other such visual indicators.

For example, the user of the app may use the camera of the smart device to take an image of the dial of the pressure gauge. In some examples, the camera may alternatively use a live image. Once the app has calculated and converted the actual pressure of the gas bottle at ambient temperature to that at 20° C., in order to provide and output a door damper gas bottle status to the user, the app may use augmented reality to superimpose an image of predefined ranges onto the image of the actual pressure gauge, such that the dial of the actual pressure gauge is shown as lying within one of the predefined range, based on the value of the converted pressure. This is depicted in FIG. 2.

When the visual indicator is a colour, and the dial is shown as lying in a red range 200 (of which in FIG. 2 there are two red ranges), then this provides an indication to the user that the pressure is too high or low, however, if the dial is in a green range 210 then the pressure is acceptable. If the dial is in the yellow range then some further adjustment may also be necessary. Due to this, the user of the app can see immediately whether or not the pressure is in the correct range, based on the colour in which the gas pressure range is based. The colour zones/ranges provided by the augmented reality may therefore be depicted as moving on a non-compensated pressure gauge, as the pressure indicated by the dial is dependent on the temperature.

In an alternative method option as shown on the right hand side of FIG. 1, the step 120 of manually inputting the pressure on the app can be replaced with the step 160 of using a camera on the smart device to capture an image of the pressure gauge dial and uploading this information. The method may further comprise the step 170 of using this image to define the pressure at ambient temperature using image processing techniques.

Once the ambient pressure has been defined 170, the method can then perform the steps 130, 140 and 150 in the same way as discussed above, in order to provide an output to the user which indicates the actual pressure of the gas bottle at 20° C. and possibly in addition also provide the door damper gas bottle status.

As mentioned above, this information may be provided in text format to the user, or, as mentioned above, this information may alternatively be provided in an alternative visual, or augmented reality format wherein the pressure is depicted as falling within a range such as shown in FIG. 2.

The invention claimed is:

1. A method of calculating and outputting pressure information about the status of an actual pressure of a gas bottle of a door damper at 20° C., performed on a smart device, the method comprising, on the smart device:

receiving, from a non-compensated pressure gauge, a pressure input indicating an actual pressure of said gas bottle of said door damper at ambient temperature, receiving a temperature input indicating an actual temperature of said gas bottle of said door damper;

using said inputs to calculate and convert said actual pressure of said gas bottle of said door damper at ambient temperature to a pressure at a temperature of 20° C.; and outputting pressure information about the status of the gas bottle of said door damper based on said converted pressure at 20° C.;

wherein said step of providing said outputted pressure information comprises providing a visual depiction, on said smart device, of whether or not the converted pressure of the gas bottle at 20° C. of said door damper lies within a predefined pressure range;

wherein said smart device comprises a camera and the method comprises taking an image of the pressure gauge using the camera of the smart device, or using the camera to produce a live image on the screen of the smart device, and using augmented reality to superimpose a visual depiction of a range or ranges on the image of the pressure gauge.

2. The method of claim 1, wherein the step of receiving said pressure input indicating an actual pressure of the gas bottle of said door damper at ambient temperature comprises manually inputting said pressure into said smart device, or wherein said smart device comprises a camera, and wherein the step of receiving a pressure input indicating an actual pressure of the gas bottle comprises capturing an image of said pressure gauge with said camera, and using image processing to determine, based on said captured image, said actual pressure of said gas bottle of said door damper at ambient temperature.

3. The method of claim 1, wherein the step of receiving said temperature input comprises obtaining said ambient temperature using a temperature sensor device that is provided externally of said smart device.

4. The method of claim 3, wherein said external temperature sensing device comprises a wired or wireless connection to the smart device and wherein said smart device is configured to receive the ambient temperature from the temperature sensing device either via the wired connection or via a wireless connection.

5. The method of claim 1, wherein the smart device comprises, or is connected or associated with, a thermal camera and wherein the step of receiving said temperature input comprises obtaining said ambient temperature input from said thermal camera.

6. The method of claim 5, wherein said outputted pressure information is provided in text form on a screen of said smart device, or using sound.

7. The method of claim 1, wherein said step of providing said outputted pressure information comprises outputting, via said smart device, said converted pressure at a temperature of 20° C.

8. The method of claim 1, wherein said step of providing said outputted pressure information comprises:

using colours to indicate whether or not the converted pressure at 20° C. of said gas bottle lies within a predefined range or ranges, and wherein one predefined pressure range is depicted in a first colour, and a second predefined range is depicted in a second colour, each colour providing an indication of whether or not that pressure range is acceptable or unacceptable.

9. A method of calculating and outputting pressure information about the status of an actual pressure of a gas bottle of a door damper at 20° C., performed on a smart device, the method comprising, on the smart device:

receiving, from a non-compensated pressure gauge, a pressure input indicating an actual pressure of said gas bottle of said door damper at ambient temperature, receiving a temperature input indicating an actual temperature of said gas bottle of said door damper;

using said inputs to calculate and convert said actual pressure of said gas bottle of said door damper at ambient temperature to a pressure at a temperature of 20° C.; and outputting pressure information about the status of the gas bottle of said door damper based on said converted pressure at 20° C.;

wherein said step of providing said outputted pressure information comprises using augmented reality to provide a superimposed image of two or more ranges on an image of the pressure gauge, such that one of said predefined ranges is positioned over the dial of said pressure gauge, based on said converted pressure at 20° C.

10. The method of claim 1, further comprising providing a QR code on said pressure gauge or on said door damper, and scanning said QR code and using said QR code to identify the pressure gauge and/or said door damper and its characteristics.

11. A non-transitory computer readable storage medium stored on a processor in a smart device that causes the processor via a control app installed on smart device to perform the steps of claim 1.

12. A system comprising:

a smart device, wherein the smart device contains computer-executable instructions to perform the method of claim 1.

* * * * *